United States Patent [19]

Teramoto et al.

[11] Patent Number: 5,351,656
[45] Date of Patent: Oct. 4, 1994

[54] FUEL SUPPLY APPARATUS

[75] Inventors: Takafumi Teramoto; Kenji Morimoto, both of Hiroshima; Hiroyasu Uchida, Higashihiroshima; Eiji Takano, Aki; Tsutomu Fukuma, Higashihiroshima; Kazuho Douzono, Hiroshima, all of Japan

[73] Assignee: Mazda Motor Corporation, Hiroshima, Japan

[21] Appl. No.: 180,805

[22] Filed: Jan. 10, 1994

Related U.S. Application Data

[63] Continuation of Ser. No. 9,757, Jan. 27, 1993, abandoned.

[30] Foreign Application Priority Data

Jan. 31, 1992 [JP] Japan .................. 4-017085
Feb. 3, 1992 [JP] Japan .................. 4-017891

[51] Int. Cl.⁵ .................. F02R 43/00; F02M 21/04
[52] U.S. Cl. .................. 123/3; 123/527; 123/DIG. 12
[58] Field of Search .................. 123/3, DIG. 12, 527

[56] References Cited

U.S. PATENT DOCUMENTS

| 4,508,064 | 4/1985 | Watanabe | 123/DIG. 12 |
| 4,520,763 | 6/1985 | Lynch et al. | 123/DIG. 12 |
| 5,092,281 | 3/1992 | Iwaki et al. | 123/DIG. 12 |
| 5,115,768 | 5/1992 | Peschka et la. | 123/DIG. 12 |
| 5,183,011 | 2/1993 | Fujii et al. | 123/DIG. 12 |

FOREIGN PATENT DOCUMENTS

| 58-36172 | 8/1983 | Japan . | |
| 0218759 | 9/1986 | Japan | 123/DIG. 12 |
| 0195369 | 8/1988 | Japan | 123/DIG. 12 |
| 0198762 | 8/1988 | Japan | 123/DIG. 12 |
| 1-23659 | 5/1989 | Japan . | |

Primary Examiner—E. Rollins Cross
Assistant Examiner—Erick Solis
Attorney, Agent, or Firm—Rish & Richardson

[57] ABSTRACT

A fuel supply apparatus for use with a gaseous fuel engine is provided with an intake passage having an inlet port open to a cylinder and adapted for supplying air into the cylinder therethrough; a fuel supply device for supplying gaseous fuel into the cylinder, the fuel supply device including at least two fuel supply systems each of which is provided with fuel amount adjusting mechanism for adjusting an amount of gaseous fuel to be supplied, the fuel supply systems including high and low pressure fuel supply systems used in a high induction zone where a large amount of air is admitted into the cylinder and in a low induction zone where a small amount of air is admitted into the cylinder, the high pressure fuel supply system being constructed so that the gaseous fuel is supplied into the cylinder during a former half of a compression stroke following an air intake stroke of the engine at a pressure higher than a pressure in the cylinder through a gaseous fuel supply port open to the cylinder independently of the inlet port, and the low pressure fuel supply system being constructed so that the accuracy of adjusting the fuel amount when a fuel supply amount is small is higher than the high pressure fuel supply system; and control means for controlling actuation of the respective fuel supply systems according to an operating state of the engine.

19 Claims, 14 Drawing Sheets

FUEL SUPPLY APPARATUS

This application is a continuation of U.S. application Ser. No. 08/009,757, filed Jan. 27, 1993, now abandoned.

BACKGROUND OF THE INVENTION AND RELATED ART STATEMENT

This invention relates to a fuel supply apparatus for use with an engine which uses gaseous fuel such as hydrogen gas.

In recent years, there has been developed a gaseous fuel engine which uses combustible gas such as hydrogen gas as fuel. When the gaseous fuel is used, its volume rate is remarkably larger than gasoline. Accordingly, if the engine is constructed such that the gaseous fuel is mixed with air in an intake passage and supplied to a combustion chamber, an amount of air admitted into the cylinder is greatly reduced to thereby cause a reduction in an engine output particularly when a large amount of fuel is supplied. Even if the gaseous fuel is supplied into the combustion chamber through a passage different from the one to supply the air to the combustion chamber, the volumetric efficiency of the air cannot be made large when the gaseous fuel having a large volume rate exists in the combustion chamber. Thus, the engine output cannot be increased.

As a measure against the above problem, the following arrangement is made in an apparatus disclosed in, for example, Japanese Examined Patent Publication No. 58-36172. Two separate passages are provided: an intake passage to supply the air and a hydrogen supply passage to supply the hydrogen gas. An inlet valve and a hydrogen supply valve are provided respectively at the intake passage and the hydrogen supply passage. The inlet valve is closed at a bottom dead center and the hydrogen supply valve is opened at the bottom dead center, so that opening periods of these valves do not overlap each other. The hydrogen gas Is supplied into the combustion chamber at a pressure higher than a pressure in the cylinder while the hydrogen supply valve is opened, Further, in an apparatus disclosed in Japanese Examined Patent Publication No. 1-23659, there are provided an inlet valve for admitting the air into a combustion chamber and a fuel supply valve for supplying the pressurized gaseous fuel, and the fuel supply valve is opened near a bottom .dead center almost before completion of an air intake stroke.

The apparatuses disclosed In the above publications are advantageous in increasing the engine output in the high induction zone by increasing the volumetric efficiency of the air since the pressurized gaseous fuel is supplied to the combustion chamber after the air intake stroke is almost completed. However, since the fuel is supplied until the pressure in the cylinder increases to a substantially high level in the compression stroke, the apparatus is required to supply the gaseous fuel at the substantially high pres sure so as to supply the fuel into the cylinder against the pressure in the cylinder during the compression stroke. The fuel supply amount is controlled by means of a flow control valve or the like arranged along a fuel supply pipe. However, it is difficult to supply the required amount of fuel accurately in the case where the amount of gaseous fuel having the large volume rate is adjusted over a range including a zone where the fuel supply amount is large while supplying the fuel under the high pressure as above. Particularly, in the low induction zone where the fuel supply amount is small, the error of the fuel supply amount becomes large, thereby standing as a hindrance to the combustion stability.

SUMMARY OF THE INVENTION

In view of the problems existing in the prior art, an object of the invention is to provide a fuel supply apparatus for use with a gaseous fuel engine which is capable of supplying gaseous fuel and admitting air in a high induction zone, and improving the accuracy of a fuel supply control in a low induction zone, thereby improving the combustion stability.

Accordingly, the invention is directed to a fuel supply apparatus for use with a gaseous fuel engine having a cylinder, comprising: an intake passage having an inlet port open to the cylinder and adapted for supplying air into the cylinder therethrough; fuel supply means for supplying gaseous fuel into the cylinder, the fuel supply means having a high pressure fuel supply system for use in a high induction zone where a larger amount of air is admitted into the cylinder, and a low pressure fuel supply system for use in a low induction zone where a smaller amount of air is admitted into the cylinder, the high pressure fuel supply system having a high pressure fuel supply port open to the cylinder independently of the inlet port, and adapted for supplying a larger amount of gaseous fuel into the cylinder at a pressure higher than a pressure in the cylinder during a former half of a compression stroke following an air intake stroke of the engine; the low pressure fuel supply system adapted for supplying a smaller amount of gaseous fuel into the cylinder at finer adjusting scale than the high pressure fuel supply system; and control means for controlling actuation of the respective fuel supply systems according to an operating state of the engine.

The fuel supply apparatus thus constructed is provided with the high pressure fuel supply system used in the high induction zone and the low pressure fuel supply system used in the low induction zone. The high pressure fuel supply system is constructed so that the gaseous fuel is supplied into the cylinder during the former half of the compression stroke following the air intake stroke of the engine at the pressure higher than the pressure in the cylinder through the gaseous fuel supply port open to the cylinder independently of the inlet port. The low pressure fuel supply system is constructed so that the accuracy of adjusting the fuel amount when a fuel supply amount is small is higher than the high pressure fuel supply system. Accordingly, in the high induction zone, the gaseous fuel which meets the required amount in this zone can be supplied without deterring admission of the air and, in the low induction zone, the accuracy of the fuel supply control can be improved. Thus, the combustion stability can be improved in the low induction zone due to the improved accuracy in the fuel supply control, and the output can be improved in the high induction zone.

The low pressure fuel supply system may be constructed so that the gaseous fuel is supplied to the cylinder at a pressure lower than the one at which the fuel is supplied by the high pressure fuel supply system during the air intake stroke. With this arrangement, the accuracy of the fuel supply control can be sufficiently improved by supplying the fuel of low pressure in the low induction zone.

The low pressure fuel supply system may also include a low pressure fuel supply port which is open directly to the cylinder and is opened and closed according to the actuation of the engine, and the low pressure fuel supply port may be opened while the inlet port is opened. With this arrangement, even when the gaseous fuel is supplied during the intake stroke in the low induction zone, the air can be admitted into the combustion chamber relatively smoothly.

The inlet port and the high pressure fuel supply port may be provided on one of two side housing which define a cylinder of a rotary piston engine together with a rotor housing. The low pressure fuel supply port is provided on the other side housing. This arrangement will not involve intersection of the intake passage, high pressure fuel supply system, and low pressure fuel supply system.

The control means may advantageously actuate only the low pressure fuel supply system in the low induction zone of the engine, actuate both the low pressure fuel supply system and the high pressure fuel supply system in an intermediate zone of the engine where a medium amount of air is admitted into the cylinder, and actuate the high pressure fuel supply system in the high induction zone of the engine. With this arrangement, the control means is permitted to execute a control suitable for required amounts of fuel and air in the respective zones.

Further, the control means may actuate only the low pressure fuel supply system when the engine is started. With this arrangement, the startability can be improved due to the improved accuracy of the fuel supply control when the engine is started.

The high pressure fuel supply system may preferably include first fuel amount adjusting means for adjusting the amount of gaseous fuel to be supplied by changing a flow area, and the low pressure fuel supply system may preferably include second fuel amount adjusting means which uses an electromagnetic fuel injection valve so as to adjust the amount of gaseous fuel to be supplied by changing an opening period of the fuel injection valve. With this arrangement, the fuel supply amount can be controlled accurately using the electromagnetic fuel injection valve in the low induction zone where the fuel supply amount is small, and a required large amount of gaseous fuel can be supplied in the high induction zone.

The first and second fuel amount adjusting means may be desirably both actuated in the high induction zone of the engine. With this arrangement, the accuracy of the fuel supply control can be improved in the high induction zone.

The control means may advantageously correct the fuel supply amount by causing the second fuel amount adjusting means to inject the fuel asynchronously during acceleration. With this arrangement, the response during the acceleration can be improved.

The high and low pressure fuel supply systems may preferably supply the fuel at specified timings in synchronism with the actuation of the engine respectively. With this arrangement, the fuel can be supplied properly without deterring admission of an air flow, or causing other problems.

The high pressure fuel supply system include a mechanical timing valve which is moved in synchronism with an engine output shaft. With this arrangement, the fuel can be supplied at a suitable timing easily and reliably.

These and other objects, features and advantages of the present invention will become more apparent upon a reading of the following detailed description and accompanying drawings.

DETAILED DESCRIPTION OF PREFERRED EMBODIMENTS OF THE INVENTION

Embodiments of the invention will be described with reference to the accompanying drawings.

FIGS. 1 to 4 show a first fuel supply apparatus for use with a gaseous fuel engine embodying the invention. The illustrated engine is a rotary piston engine. In this embodiment, hydrogen gas is used as gaseous fuel.

Figure 1:
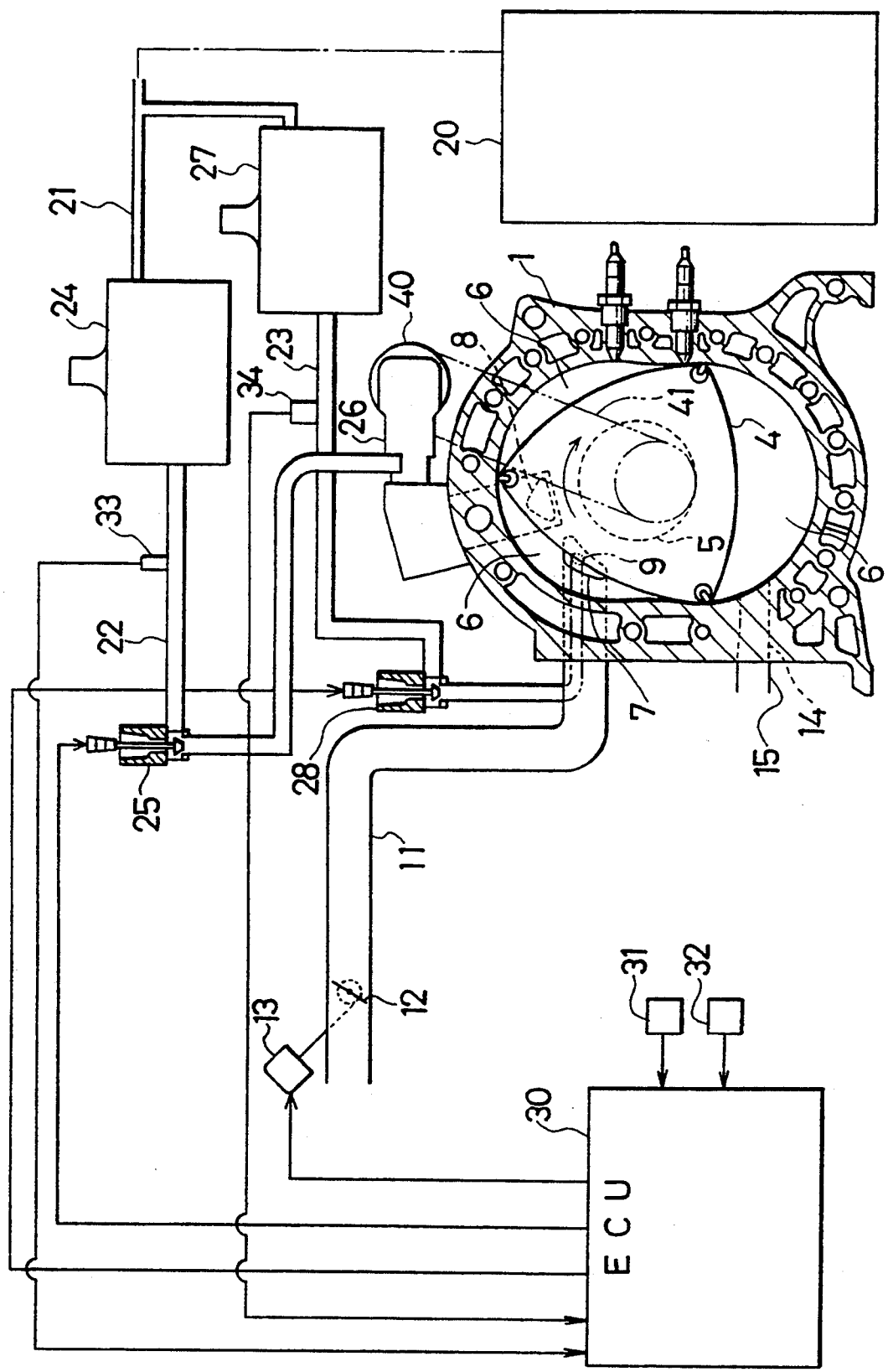
FIG. 1 is a diagram showing an overall construction of a gaseous fuel engine incorporating a first embodiment of the invention.

An overall construction of the rotary piston engine and the fuel supply apparatus are shown in FIG. 1. A rotary piston includes a housing 1 having a peritrochoidal inner circumferential surface, side housings 2, 3 positioned at opposite sides of the housing 1, and a rotor 4 configured into a substantially triangular form, which is arranged inside the housings. In the rotary piston engine including two rotors, front and rear cylinders are formed before and after an intermediate housing (intermediate side housing) 3, and the rotor 4 is arranged in each of thus formed cylinders (see FIG. 4). The rotor 4 is mounted on an eccentric shaft 5, and defines three working chambers in the corresponding cylinder. Further, a top portion of the rotor 4 is in sliding contact with the inner circumferential surface of the housing 1. According to the eccentric rotation of the rotor 4, the volume of the respective working chambers 6 changes, thereby carrying out an Otto cycle. The rotation of the rotor 4 drivingly rotates the eccentric shaft At one of the side housings of this rotary piston engine, for example, at the intermediate housing 3, an inlet port 7 is defined in such a position as to face the working chamber 6 of an intake stroke. At this intermediate housing 3 is also defined a high pressure hydrogen port (gaseous fuel supply port) 8 through which the hydrogen gas of relatively high pressure conveyed through a high pressure fuel supply pipe to be described later is supplied into the working chamber 6, independently of the inlet port 7. Further, at the side housing 2 opposed to the intermediate housing 3 is defined a low pressure hydrogen port (low pressure gaseous fuel supply port) 9 through which the hydrogen gas of relatively low pressure conveyed through a low pressure fuel supply pipe to be described later is supplied into the working chamber 6.

To the inlet port 7 is supplied air through an intake passage 11 in which there are arranged a throttle valve 12 actuated by a step motor 13, unillustrated air cleaner and airflow meter for detecting an amount of air, etc. At the housing 1 facing the working chamber of an exhaust stroke is defined an exhaust port to which an exhaust passage 15 is connected. In the exhaust passage 15, there are arranged unillustrated oxygen sensor and catalyzer.

A system for supplying the hydrogen gas as gaseous fuel includes a fuel supply pipe 21 for conveying the hydrogen gas from a metal hydride tank (hereinafter referred to as MH tank) 20. The MH tank 20 is provided with a hydrogen occlusion alloy capable of occluding and releasing the hydrogen therein. To the MH tank 20 is connected unillustrated passage for filling the hydrogen, passage for coolant, and passage for heated water. The hydrogen occlusion alloy of the Mt tank 20 is heated by the coolant supplied from an engine water jacket, and thereby the hydrogen is released to the fuel supply pipe.

The fuel supply pipe 21 is branched into a high pressure fuel supply pipe 22 constituting a fuel supply system used in a low induction zone where a small amount of air is admitted into the cylinder and a low pressure fuel supply pipe 23 constituting a fuel supply system used in a high induction zone where a large amount of air is admitted into the cylinder. A downstream end of the high pressure fuel supply pipe 22 is connected to the high pressure hydrogen port 8, whereas a downstream end of the low pressure fuel supply pipe 23 is connected to the low pressure hydrogen port 9. Along the high pressure fuel supply pipe 22 are arranged a pressure adjuster 24 for the hydrogen gas of high pressure, a flow control valve (fuel amount adjusting means) 25, a timing valve 26, etc. The hydrogen gas supplied from the MH tank 20 is supplied to the high pressure hydrogen port 8 through the timing valve 26 after having the pressure thereof adjusted by the pressure adjuster 24 and having the flow rate thereof adjusted by the flow control valve Along the low pressure fuel supply pipe 23 are arranged a pressure adjuster 27 for the hydrogen gas of low pressure, a flow control valve (fuel amount control means) 28, etc. The hydrogen gas supplied from the MH tank 20 is supplied to the low pressure hydrogen port 9 after having the pressure thereof adjusted by the pressure adjuster 27 and having the flow rate thereof adjusted by the flow control valve 28.

The pressure adjuster 24 arranged along the high pressure fuel supply pipe 22 is adapted for adjusting the pressure of the hydrogen gas supplied from the MH tank 20 at a relatively high value, so that the hydrogen gas can be fed into the working chamber 6 against the pressure in the working chamber 6 even during a compression stroke. For example, the pressure adjuster 24 adjusts the pressure of the hydrogen gas to about 5 arm. On the other hand, the pressure adjuster 27 arranged along the low pressure fuel supply pipe 23 is adapted for adjusting the pressure of the hydrogen gas to a value sufficiently lower than the pressure adjuster 24 enough to feed the hydrogen gas into the working chamber 6 during the intake stroke when the pressure in the working chamber 6 is low. The respective flow control valves 25. 28 control a flow rate of the hydrogen gas in the fuel supply pipes 22, 23 continuously using duty solenoid valves, proportional solenoid valves, or the like. When the flow control valve 25 or 28 is completely closed, the supply of the hydrogen gas from the corresponding system is stopped.

A control system including a control unit (ECU) 30 selects one of the fuel supply systems used in the low and high induction zones and controls an amount of the hydrogen gas to be supplied. To the ECU 30 are input a sensor signal from an engine speed sensor 31 for detecting the engine speed, a sensor signal from an accelerator sensor 32 for detecting an operated amount of an accelerator pedal, sensor signals from pressure sensors 33, 34 for detecting the pressure in the respective fuel supply pipes 22 and 23, and like signals. The ECU 30 sends a control signal to the respective flow control valves 25, 28. Since the opening of the throttle valve is controlled electrically according to the operated amount of the accelerator pedal in the illustrated example, a control signal is also sent to an actuator for the throttle valve 12.

The ECU 30 executes a control in accordance with a flow chart to be described later, thereby constituting control means for actuating at least a low pressure fuel supply system in the low induction zone of the engine while actuating a high pressure fuel supply system in the high induction zone of the engine.

Figure 2:
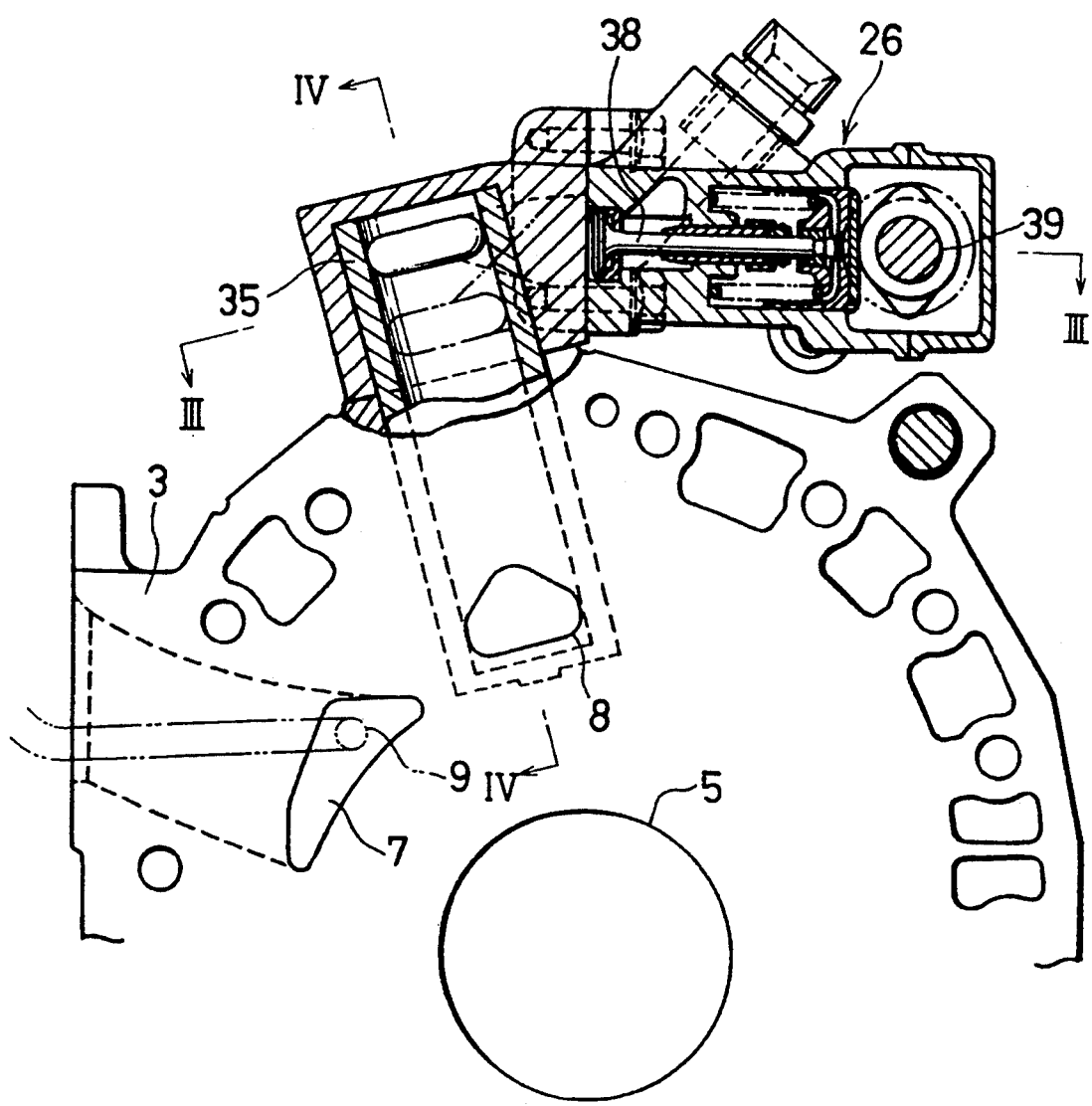
FIG. 2 is a fragmentary sectional view showing enlargedly an essential portion of the gaseous fuel engine shown in FIG. 1.
Figure 3:
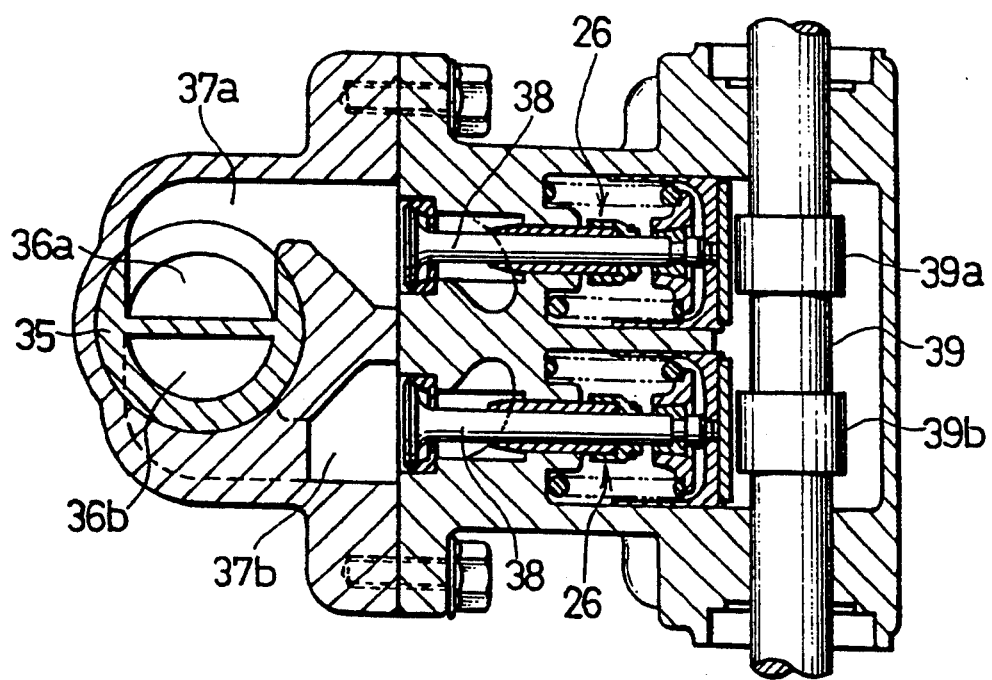
FIG. 3 is a sectional view taken along the line III—III in FIG. 2.
Figure 4:
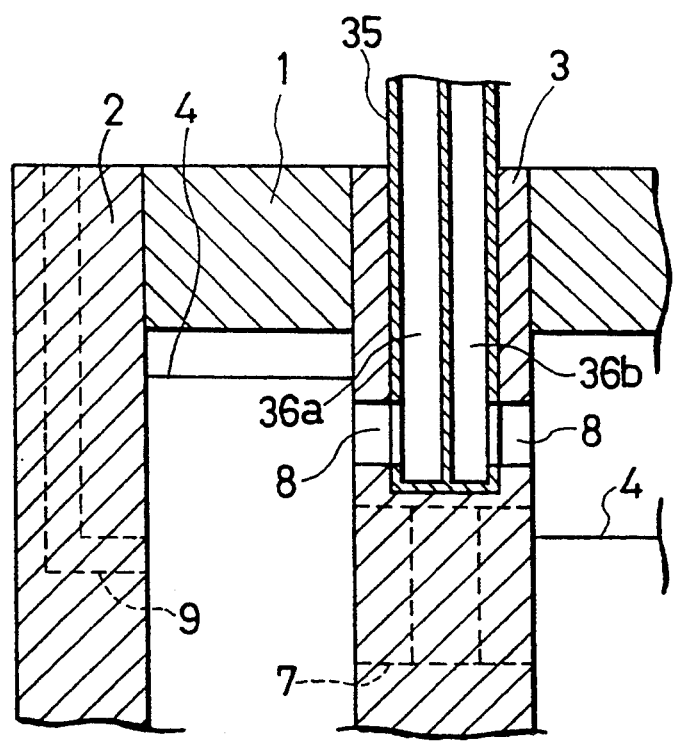
FIG. 4 is a sectional view taken along the line IV—IV in FIG. 2.

FIGS. 2 to 4 show a specific construction of the fuel supply apparatus including arrangement of the inlet port 7 and hydrogen port 8, 9 and the timing valves 26 in the hydrogen gas supply system.

The high pressure hydrogen port 8 is formed in the intermediate housing 3 in such a position as not to interfere with the inlet port 7, and is open to the working chamber 6. The port 8 is formed into a relatively large opening so as to reduce the flow resistance. This port 8 is in communication with a passage defined by a member 35 inserted in the intermediate housing 3. The passage defining member 35 is configured into a hollow cylindrical form having therein two separate pipes 36a, 36b for the front and rear cylinders. Downstream ends of the pipes 36a, 36b are in communication with the respective high pressure hydrogen ports 8 at the front and rear sides, and upstream ends thereof are in communication with pipes 37a, 37b extending to the timing valves 26. It may be appropriate to use a rotary valve as the passage defining member 35 and to couple the actuator with this rotary valve, so that a flow rate of the hydrogen gas can be also controlled by the rotary valve.

In the illustrated example, there are two timing valves 26 arranged in parallel for the front and rear cylinders. Each timing valve 26 includes a popper valve 38, and is actuated to open and close by cams 39a, 39b mounted on a cam shaft 39 for driving the timing valve 26. This cam shaft 39 is supported rotatably on the housing, and a pulley 40 mounted at one end thereof is linked with the eccentric shaft 5 through a timing belt 41 (see FIG. 1). Accordingly, the cam shaft 39 is rotatable together with the eccentric shaft 5.

The low pressure hydrogen port 9 is defined in the side housing 2 in a position opposed to the inlet port 7 and is open to the working chamber 6. To the low pressure hydrogen port 9 is connected directly the downstream end of the low pressure fuel supply pipe 23.

Figure 5:
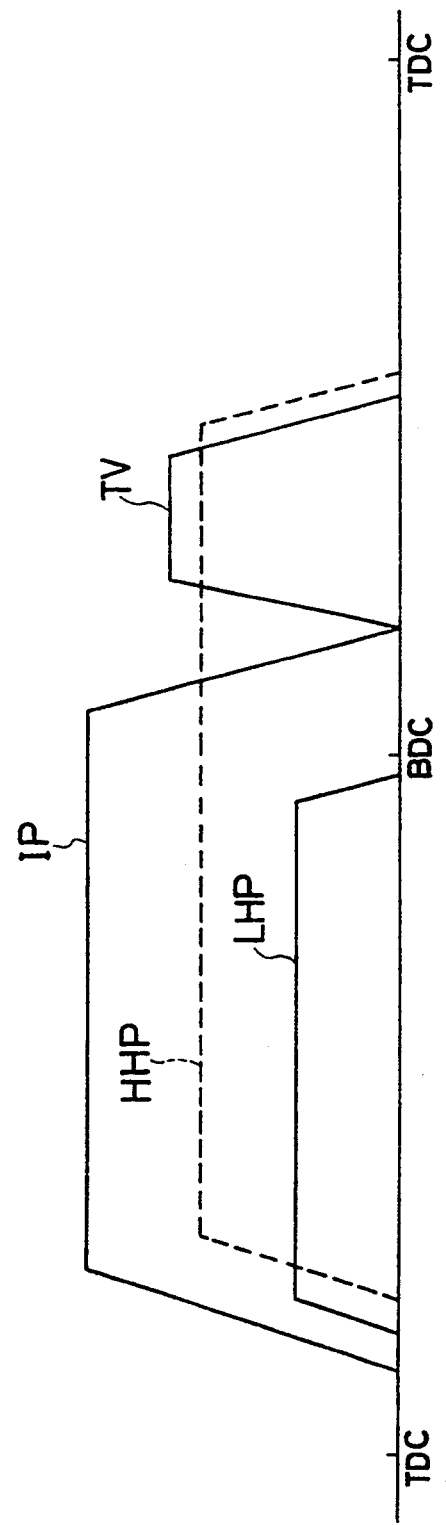
FIG. 5 is a chart showing exemplary opening and closing timings of an inlet port, a hydrogen port, and a timing valve.

FIG. 5 shows specific examples of opening and closing timings of the inlet port 7, the high pressure hydrogen port 8, the timing valve 26, and low pressure hydrogen port 9. As shown in this figure, the inlet port 7 is arranged and shaped so as to open for a period defined by a timing close to a top dead center and a specified timing after a bottom dead center according to the rotation of the rotor 4 (indicated at IP).

The high pressure hydrogen port 8 is also opened and closed according to the rotation of the rotor 4. The port 8 is arranged and shaped so as to open slightly later than the opening timing of the inlet port 7 and to close during the compression stroke much later than the closing timing of the inlet port 7 (as indicated at HHP). The timing valve 26 is opened for a part of the period during which the high pressure hydrogen port 8 is opened, and the opening timing of the timing valves 26 coincides with the closing timing of the inlet port 7 (as indicated at TV). In the high pressure fuel supply system, the opening period of the timing valve 26 serves as a hydrogen gas supply period. Further, the low pressure hydrogen port 9 is arranged and shaped so as to be opened only for a specific period during the intake stroke (as indicated at LHP). In the low pressure fuel supply system, the opening period of the port 9 itself serves as a fuel supply period.

Figure 6:
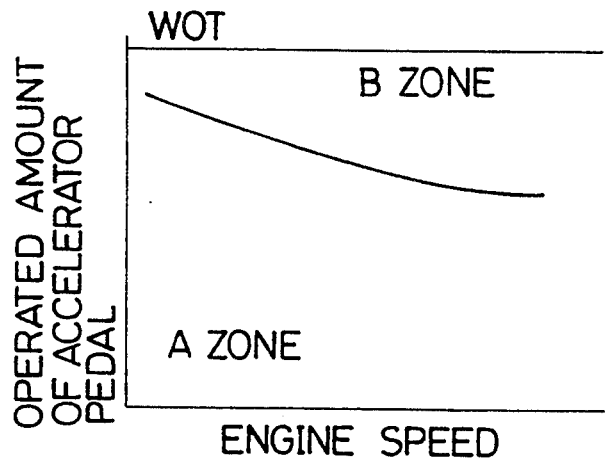
FIG. 6 is a diagram graphically showing an example of control zone setting.

FIG. 6 shows graphically setting of zones to be discriminated in a control to be described later. In this figure, A zone is a zone in which the low pressure fuel supply system is actuated. The A zone is located below a discrimination line, i.e., a smaller amount of air is admitted into the cylinder in the A zone than any point on the discrimination line. Further, B zone is a zone in which only the high pressure fuel supply system is actuated. The B zone is located above the discrimination line, i.e., a larger amount of air is admitted into the cylinder in the B zone than any point on the discrimination line.

Figure 7:
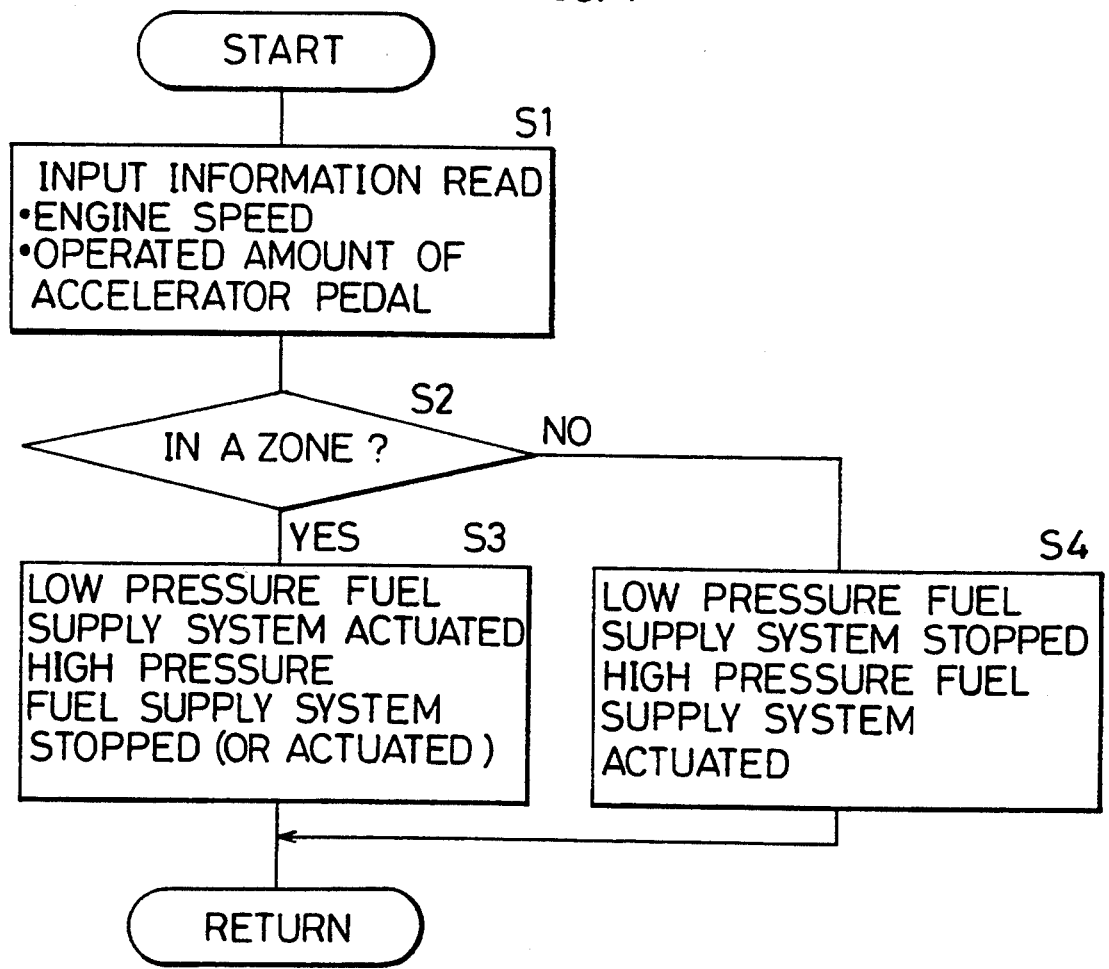
FIG. 7 is a flow chart showing an example of fuel supply control based on the zone setting shown in FIG. 6.

FIG. 7 shows an example of hydrogen gas supply control executed by the ECU 30. In this flow chart, upon start of the control, the engine speed and the operated amount of the accelerator pedal are read as input information in Step and it is discriminated whether a present operating state lies in the A zone in FIG. 6 based on the input information in Step 52. If the present operating state lies in the A zone, the flow control valve 28 of the low pressure fuel supply pipe 23 is opened to thereby actuate the low pressure fuel supply system while closing the flow control valve 25 of the high pressure fuel supply pipe 22 to thereby stop the actuation of the high pressure fuel supply system in Step S3. In this case, the fuel supply amount is controlled by controlling the opening of the flow control valve 28 according to the air amount.

On the other hand, if the present operating state lies outside the A zone (lies in the B zone), the flow control valve 28 is closed to thereby stop the actuation of the low pressure fuel supply system while opening the flow control valve 25 to thereby actuate the high pressure fuel supply system. In this case, the opening of the flow control valve 25 is controlled according to the amount of air.

With the apparatus of this embodiment as described above, the low pressure fuel supply system is actuated in the low induction zone, and the hydrogen gas having the pressure thereof adjusted to a relatively low value is admitted into the working chamber 6 through the low pressure hydrogen port 9. In this case, it becomes difficult to admit a large amount of air into the cylinder since the hydrogen gas is supplied during the air intake stroke. However, since the air amount and the fuel supply amount are small in the low induction zone, required amounts of air and fuel can be easily supplied. The hydrogen gas can be supplied at a relatively low pressure by supplying the hydrogen gas during the intake stroke in this way, and accuracy of the fuel supply control can be improved by controlling the flow control valve 28 in a low pressure supply state.

On the other hand, in the high induction zone, if the hydrogen gas is supplied during the intake stroke, admission of the air to the cylinder is prevented and thus a required amount of air cannot be supplied. However, since the high pressure fuel supply system is actuated so as to supply the hydrogen gas through the timing valve 26 after completion of the intake stroke in this zone, the volumetric efficiency of air can be improved. This is also effective in preventing a backfire.

It may be appropriate to actuate the high pressure fuel supply system in addition to the low pressure fuel supply system in the control when the operating state lies in the low induction zone. In this case, the sharing ratio of the two fuel supply systems is set; the fuel supply amounts of the respective systems are obtained according to the set sharing ratio; and the flow control valves 25, 28 are controlled according to the obtained fuel supply amounts. Even in this case, the apparatus is effective in improving the accuracy of the fuel supply control compared to the case where the hydrogen gas is introduced only through the high pressure fuel supply system.

Figure 8:
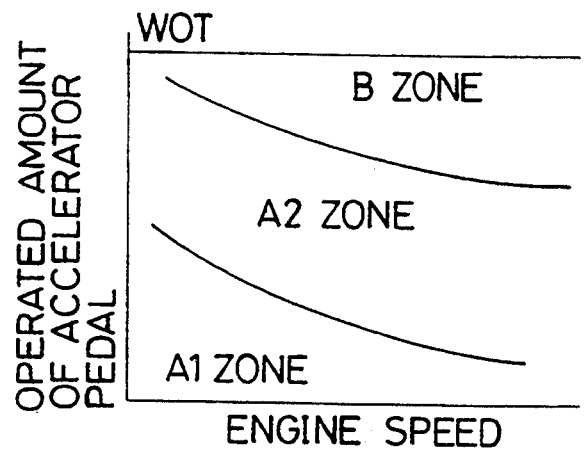
FIG. 8 is a diagram graphically showing another example of control zone setting.
Figure 9:
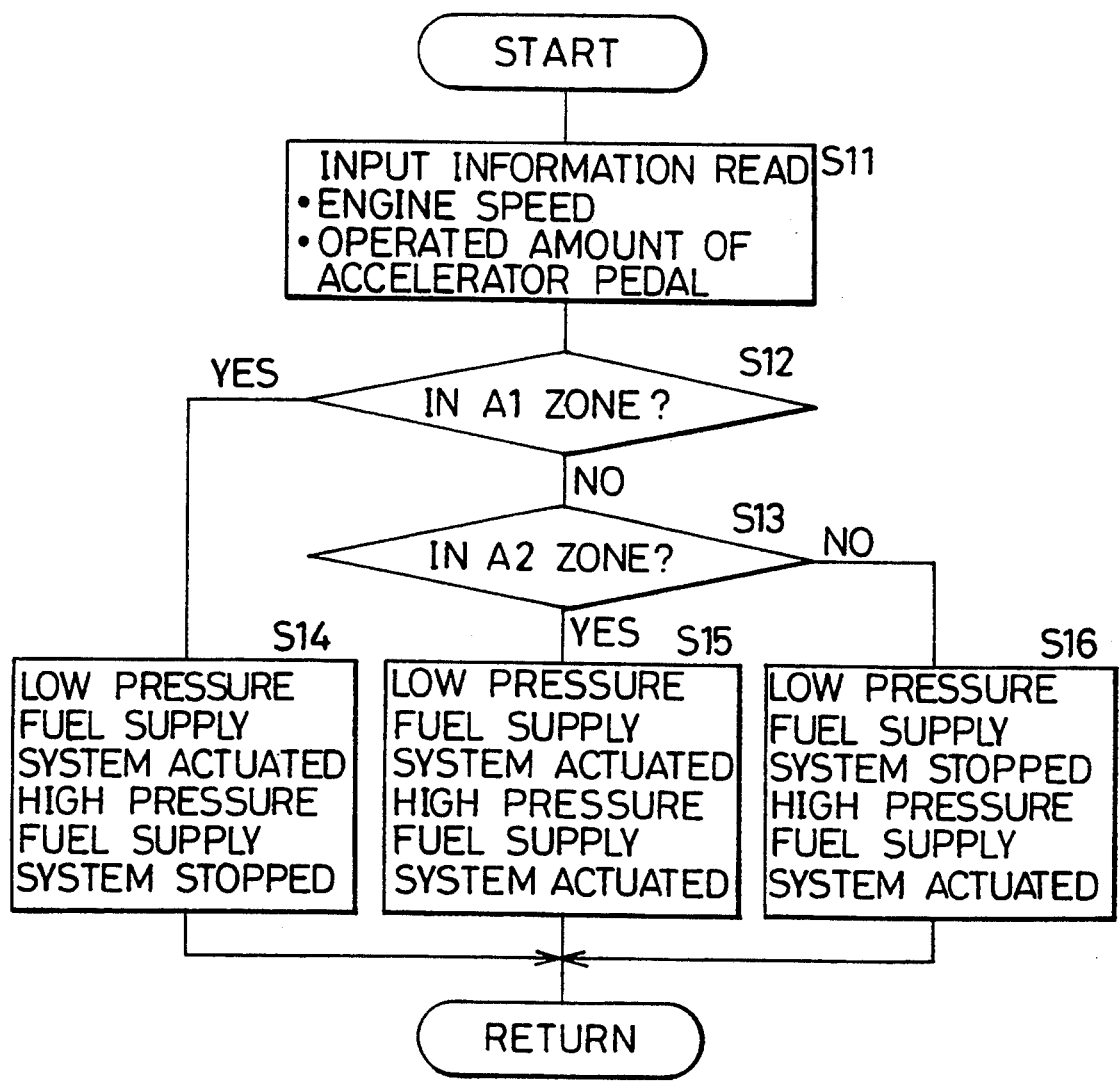
FIG. 9 is a flow chart showing an example of fuel supply control based on the zone setting shown in FIG. 8.

FIGS. 8 and 9 show another example of fuel supply control. In this example, there are set three zones as shown in FIG. 8: A1 zone (low induction zone) located below a first discrimination line, A2 zone (intermediate zone in which a medium amount of air is admitted into the cylinder) located between the first and second discrimination lines, and B zone (high induction zone) located above the second discrimination line.

In a flow chart of FIG. 9, an input information is read in Step S11, and it is discriminated in which zone a present operating state lies in Steps S12, S13. If the present operating state lies in the A1 zone, the low pressure fuel supply system is actuated while the actuation of the high pressure fuel supply system is stopped in Step S14. If the present operating state lies in the A2 zone, the low and high pressure fuel supply systems are both actuated in Step S15. Further, if the present operating state lies in the B zone, the high pressure fuel supply system is actuated while the actuation of the low pressure fuel supply system is stopped in Step S16.

In this example, in the intermediate zone, the accuracy of the fuel supply control can be improved compared to the case where only the high pressure fuel supply system is actuated while ensuring a required amount of air in this zone.

Figure 10:
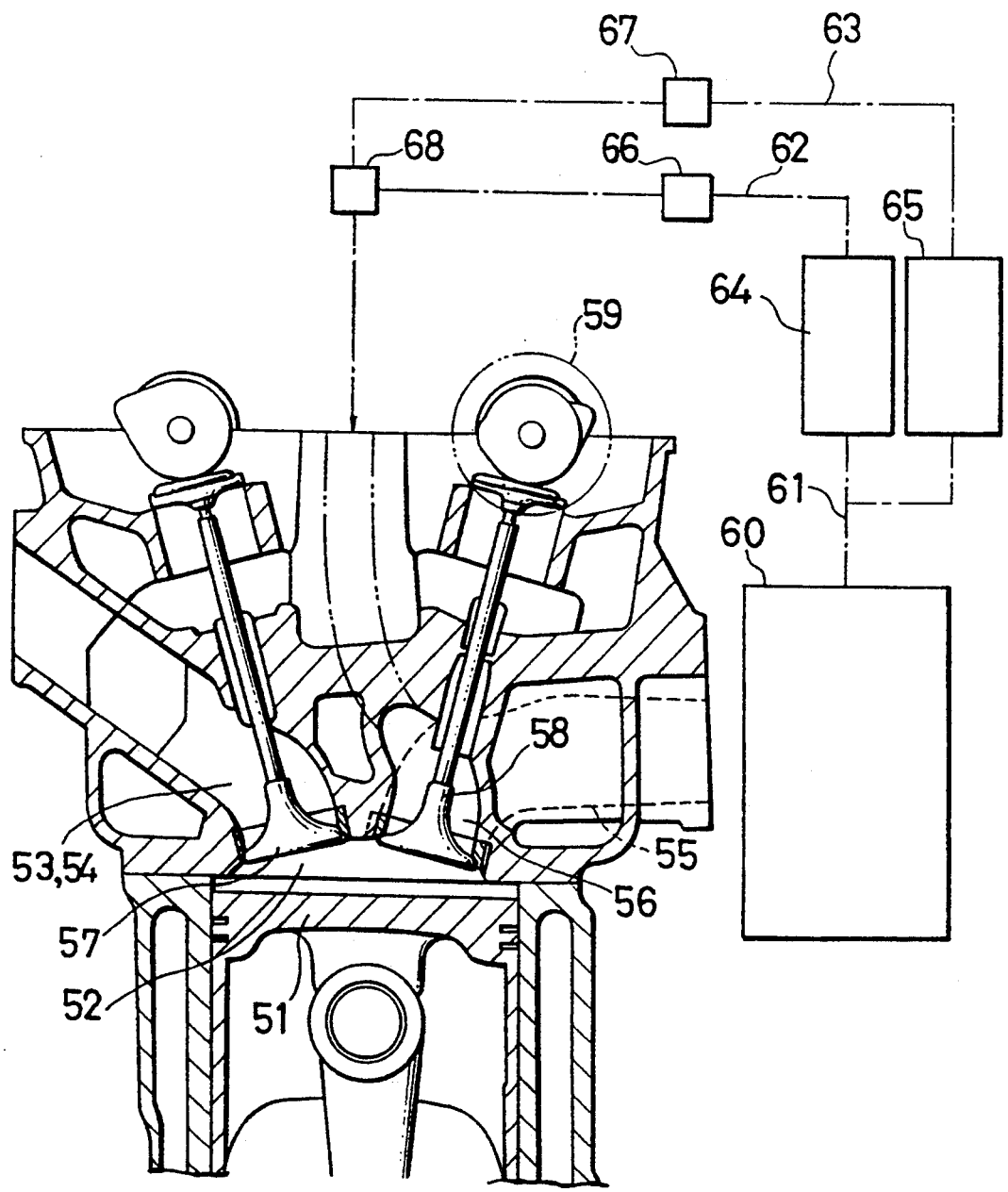
FIG. 10 is a sectional view showing a second embodiment of the fuel supply apparatus according to the invention.

FIG. 10 shows as a second embodiment a case where the fuel supply apparatus substantially similar to the first embodiment is applied to a reciprocating engine. In this embodiment, two inlet ports 53, 54, an exhaust port 55, and a hydrogen port 56 are open to a combustion chamber 52 located above a piston 51 in a cylinder of the engine. Inlet valves 57, an unillustrated exhaust valve, and a timing valve 58 are respectively provided at the inlet ports 53, 54, the exhaust port 55, and the hydrogen port 56. This timing valve 58 includes a popper valve similar to the inlet valves 57 and the exhaust valve, and a valve timing changing mechanism 59 is incorporated in a valve lifting mechanism for the valve 58. This changing mechanism 59 changes the opening timing of the valve 58 during the intake stroke and the compression stroke. Further, a fuel supply pipe 61 connected to an MH tank 60 is branched into high and low pressure fuel supply pipes 62, 63. Along the high pressure fuel supply pipe 62 are arranged a pressure adjuster 64 and a flow control valve 66. Along the low pressure fuel supply pipe 63 are arranged a pressure adjuster 65 and a flow control valve 67. The pipes 62, 63 are selectively connected to the hydrogen port 56 through a directional control valve 68. In a low induction zone where a small amount of air is admitted into the cylinder, the valve 58 is caused to open at an earlier timing, and the low pressure fuel supply pipe 63 is connected to the hydrogen port 56. In a high induction zone where a large amount of air is admitted into the cylinder, the valve 58 is caused to open at a delayed timing, and the high pressure fuel supply pipe 62 is connected to the hydrogen port 56.

There will be next described a modification of the fuel supply apparatus as constructed similar to the first or second embodiment.

It is desirable to actuate only the low pressure fuel supply system when the engine is started. In other words, it is desirable to execute a fuel supply control with high accuracy by actuating the low pressure fuel supply system when the engine is started since air shortage is highly unlikely to occur because a required air amount is small and the operating state is unstable.

The low pressure fuel supply system may not necessarily supply the hydrogen gas directly into the cylinder, but may be supply the hydrogen gas to the intake passage.

Figure 11:
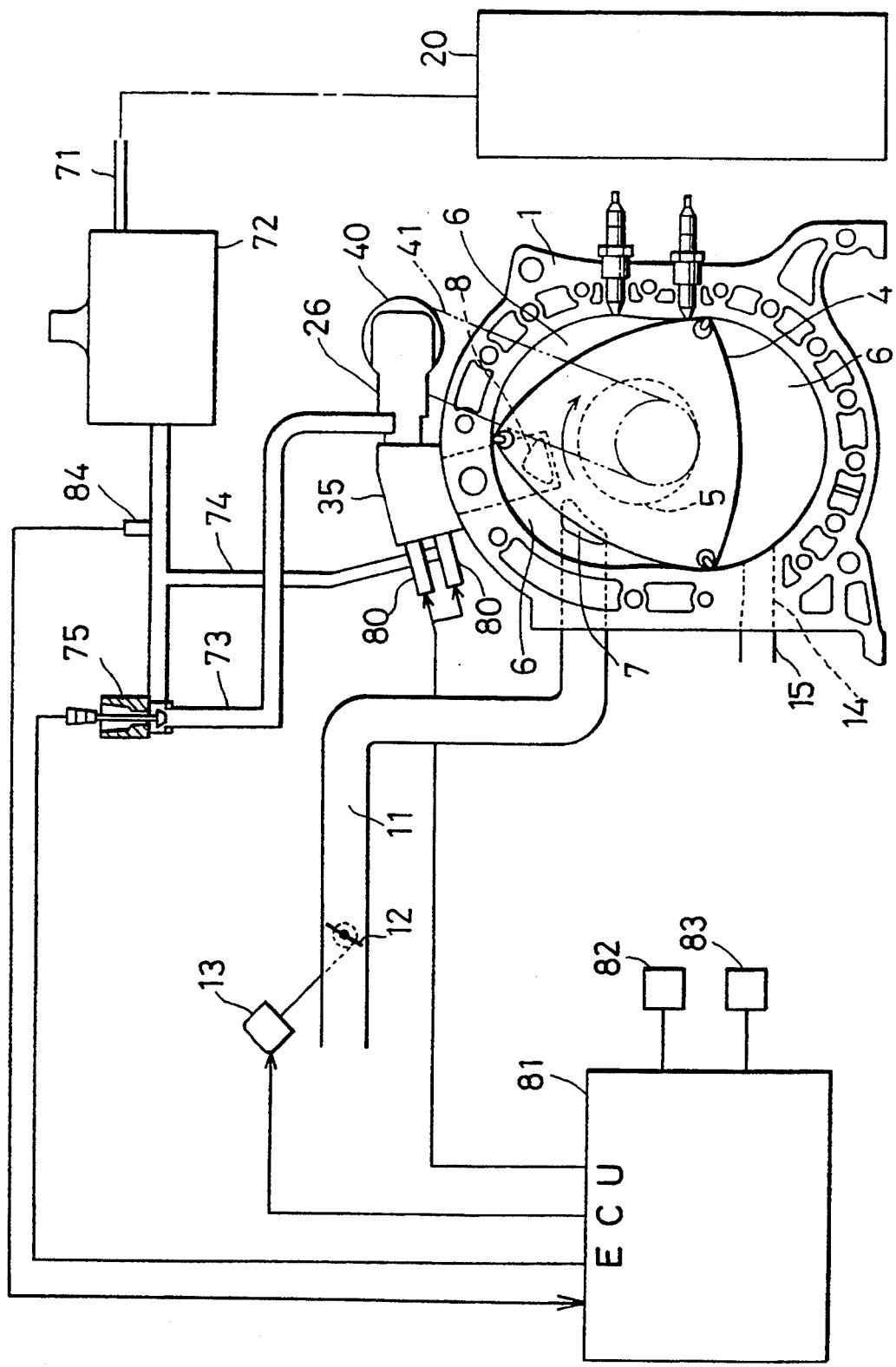
FIG. 11 is a diagram showing an overall construction of a gaseous fuel engine incorporating a third embodiment of the invention.
Figure 12:
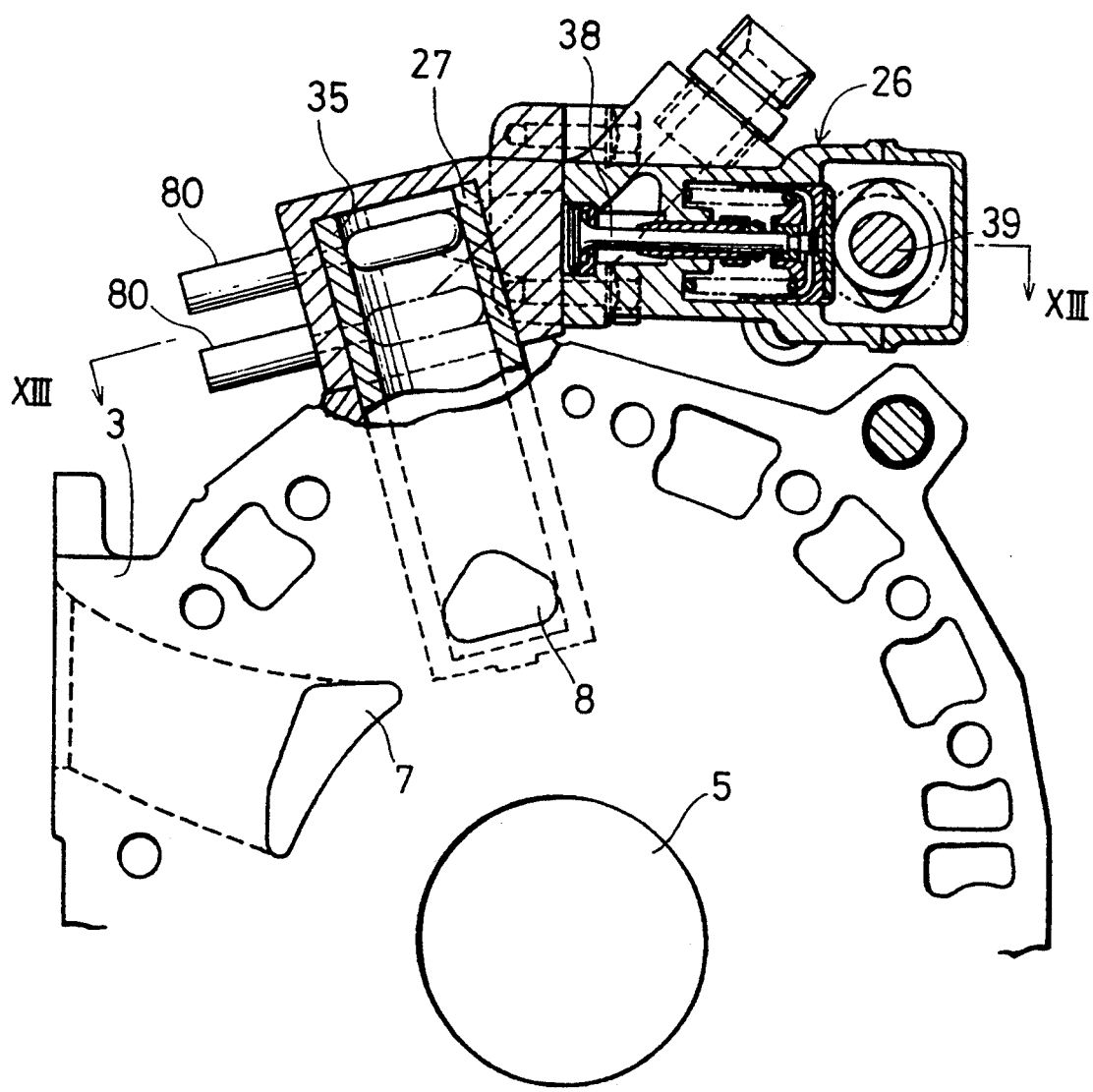
FIG. 12 is a fragmentary sectional view showing enlargedly an essential portion of the gaseous fuel engine shown in FIG. 11.
Figure 13:
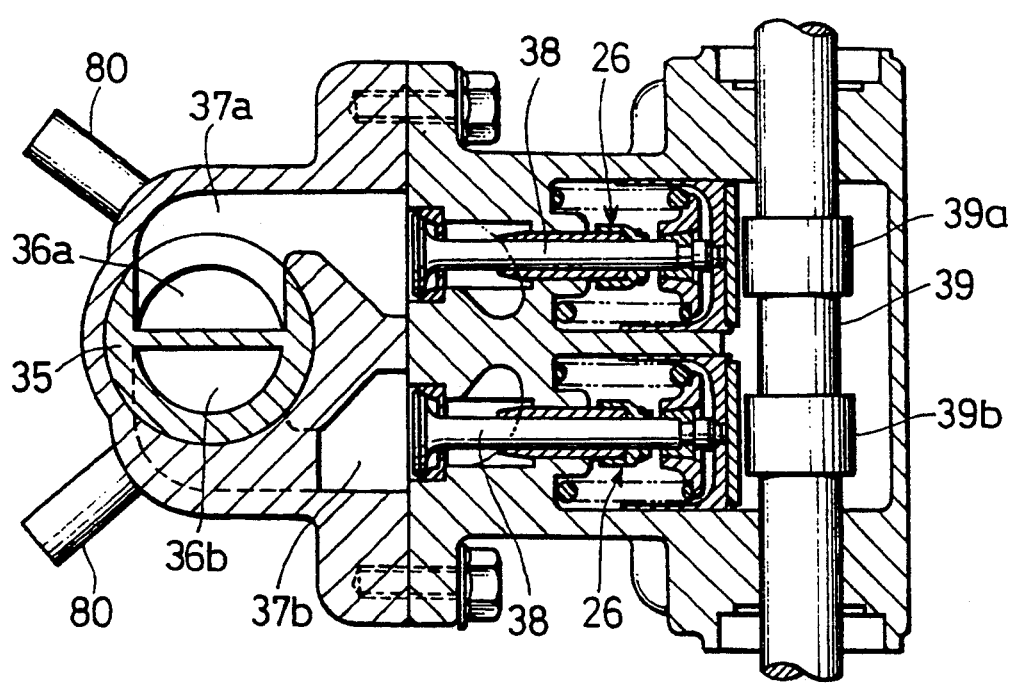
FIG. 13 is a sectional view taken along the line XIII—XIII in FIG. 12.

FIGS. 11 to 13 shows a third embodiment according to the invention. An engine of this embodiment is a rotary piston engine similar to the first embodiment, and accordingly no description is given on the engine by designating like reference numerals to like parts.

At an intermediate housing 3 of this engine is defined a hydrogen port 8 of the same type as the high pressure hydrogen port in the first embodiment, independently of an inlet port 7.

A system for supplying the hydrogen gas as gaseous fuel is provided with a fuel supply pipe 71 for conveying the hydrogen gas from an MH tank 20. Along the fuel supply pipe 71 is arranged a pressure adjuster 72 for adjusting the pressure of the hydrogen gas supplied from the MH tank 20 to about 5 atm. (3 to 7 atm.). The fuel supply pipe 71 is branched into first and second fuel supply pipes 73 and 74 downstream from the pressure adjuster 72. The first fuel supply pipe 73 constitutes a fuel supply system for use in a high induction zone where a large amount of air is admitted into the cylinder, and is provided with a first fuel amount adjusting mechanism for controlling an amount of gaseous fuel to be supplied by changing a flow area. The second fuel supply pipe 74 constitutes a fuel supply system for use in a low induction zone where a small amount of air is admitted into the cylinder, and is provided with a second fuel amount adjusting mechanism for controlling the gaseous fuel to be supplied by changing an opening period of an electromagnetic fuel injection valve. The first and second fuel amount adjusting mechanisms are arranged and connected in parallel to the hydrogen port 8.

The first fuel amount adjusting mechanism includes a flow control valve 75 and a timing valve 26 disposed downstream from the valve 75. A downstream side of the timing valve 26 is connected to a passage defining member 35 extending to the hydrogen port 8. The flow control valve 75 includes a duty solenoid valve, proportional solenoid valve, or the like, so as to control the flow area of the first fuel pipe 73 continuously.

Since the timing valve 26 and the passage defining member 35 are similar to those in the first embodiment, no description is given on these elements by designating the same reference numerals as in FIGS. 2 and 3 to these elements in FIGS. 12 and 13.

On the other hand, the first fuel amount adjusting mechanism is provided with an injector 80 which is an electromagnetic fuel injection valve. An injection period and an injection timing of this injector 80 are controlled in accordance with an injection pulse from an ECU 81. The amount of hydrogen gas to be supplied is controlled by changing the injection period, and the fuel is injected at specified timing in synchronism with actuation of the engine. In the illustrated example, there are provided two injectors 80 for front and rear cylinders. These injectors 80 are mounted on a casing so as to inject the fuel into a passage defined in the member 35. Further, a downstream end of the second fuel supply pipe 74 is connected to the injectors 80.

The first and second fuel amount adjusting mechanisms are controlled by control means including a control unit (ECU) 81. To the ECU 81 are input a sensor signal from an engine speed sensor 82 for detecting the engine speed, a sensor signal from an accelerator sensor 83 for detecting an operated amount of an accelerator pedal, a sensor signal from a pressure sensor 84 for detecting the pressure in the fuel supply pipe 71 downstream from the pressure adjuster 72, and like signals. The ECU 81 sends a control signal to the flow control valve 75 and the injectors 80. Since the opening of a throttle valve 12 is controlled electrically according to the operated amount of the accelerator pedal in the illustrated example, a control signal is also sent to an actuator 13 for the throttle valve 12.

The ECU 81 executes a control in accordance with a flow chart to be described later, thereby constituting the control means for actuating only the second fuel amount adjusting mechanism in the low induction zone of the engine while actuating at least the first fuel amount adjusting mechanism in the high induction zone of the engine.

Figure 14:
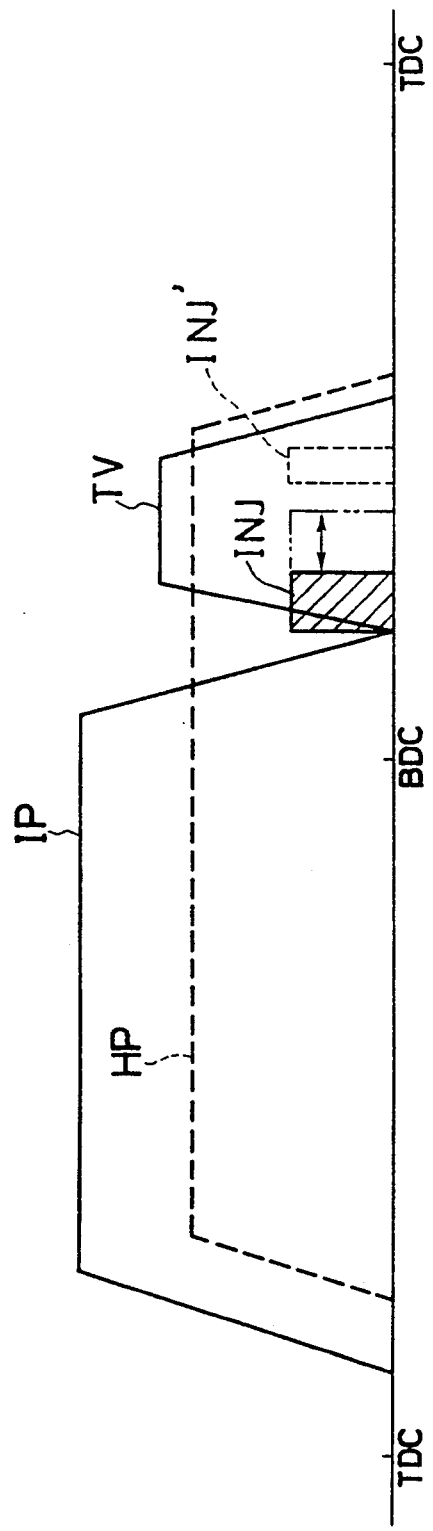
FIG. 14 is a chart showing exemplary opening and closing timings of an inlet port, a hydrogen port, and a timing valve.

FIG. 14 shows specific examples of opening and closing timings of the inlet port 7, the hydrogen port 8, and the timing valve 26, and the injection timing of the injectors 80. The opening and closing timings (IP, HP, TV) of the inlet port 7, the hydrogen port 8, and the timing valve 26 are similar to the examples shown in FIG. 5.

The injectors inject the fuel at the specified timings and only for a period corresponding to the pulse signal as indicated at reference INJ and by oblique line in FIG. 14. The injection period is changed as indicated by solid line and phantom line in correspondence with a change in the pulse duration of the injection pulse according to the operating state, thereby controlling the amount of fuel to be injected. It is desirable to conduct an asynchronous fuel injection INJ' as indicated by broken line in FIG. 14 during acceleration in addition to the fuel injection at the specified timing.

Figure 15:
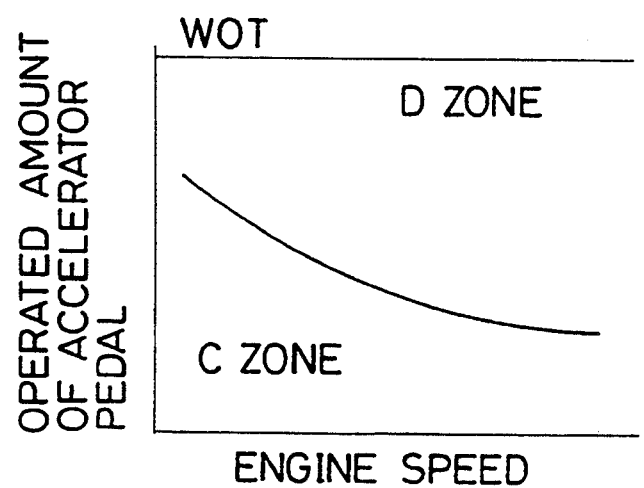
FIG. 15 is a diagram graphically showing an example of control zone setting.

FIG. 15 shows graphically setting of zones to be discriminated in a control to be described later. In this figure. C zone is a zone in which the second fuel amount adjusting mechanism is actuated. The C zone is located below a discrimination line, i.e., a smaller amount of air is admitted into the cylinder in the A zone than any point on the discrimination line. Further, D zone is a zone in which the first fuel amount adjusting mechanism is actuated. The D zone is located above the discrimination line, i.e., a larger amount of air is admitted into the cylinder in the B zone than any point on the discrimination line.

Figure 16:
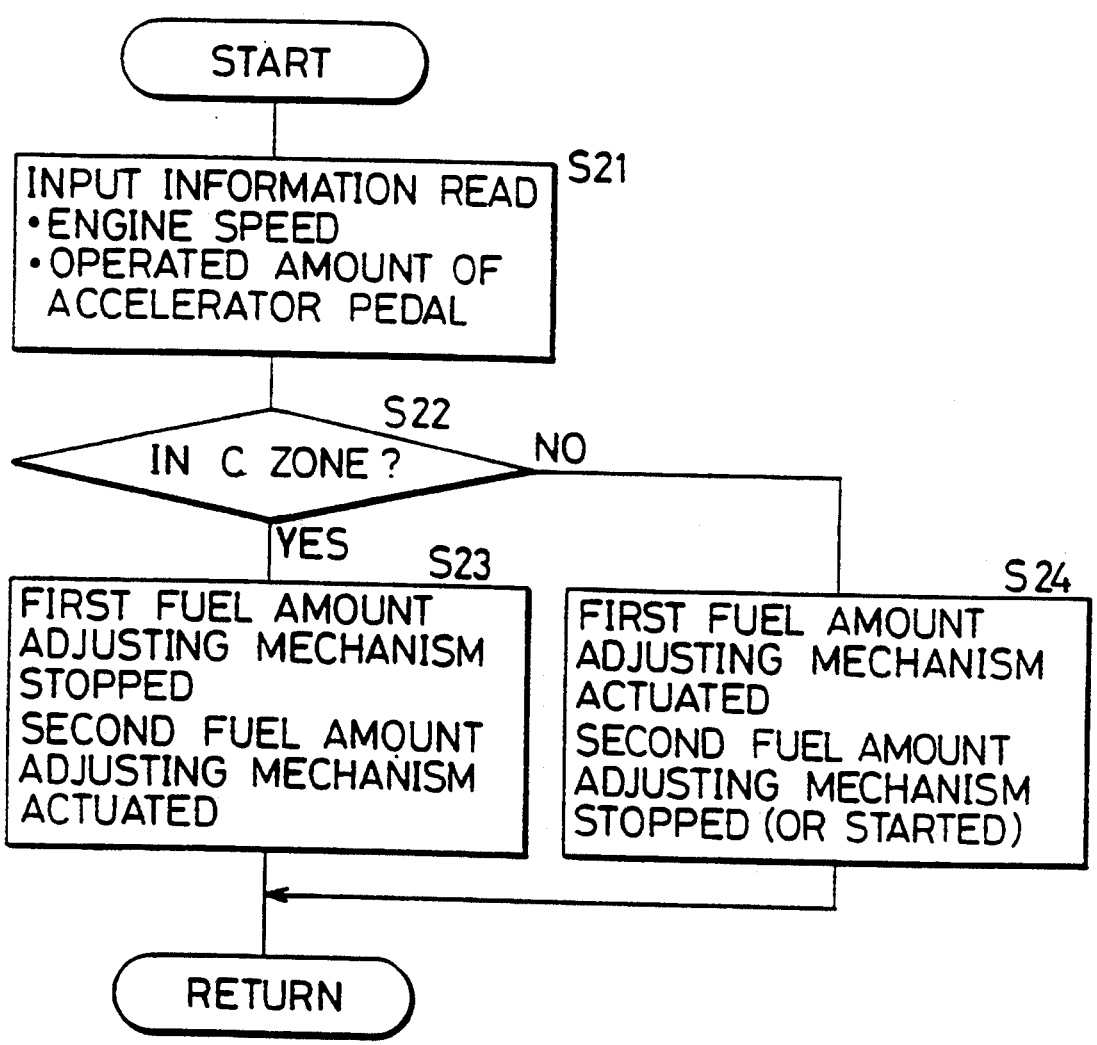
FIG. 16 is a flow chart showing an example of fuel supply control based on the zone setting shown in FIG. 15.

FIG. 16 shows an example of hydrogen gas supply control executed by the ECU 81. In this flow chart, upon start of the control, the engine speed and the operated amount of the accelerator pedal are read as input information in Step S21 and it is discriminated whether a present operating state lies in the C zone in FIG. 6 based on the input information in Step S22. If the present operating state lies in the C zone, the flow control valve 75 is controllably closed completely to thereby stop actuation of the first fuel amount adjusting mechanism, and the injection pulse is applied to the injectors 80 to thereby actuate the second fuel amount adjusting mechanism. In this case, the fuel supply amount is controlled by adjusting the pulse duration of the injection pulse according to the operating state, or the like.

If the present operating state lies outside the C zone, application of the injection pulse to the injectors 80 stopped to thereby stop actuation of the second fuel amount adjusting mechanism, and the flow control valve 75 is opened to thereby actuate the first fuel amount adjusting mechanism. In this case, the fuel supply amount is controlled by controlling the opening of the flow control valve 75.

With thus constructed fuel supply apparatus of this embodiment, the injectors 80 of the second fuel amount adjusting mechanism are actuated in a low engine speed region so as to control the fuel supply amount. In this case, the ECU 81 calculates the pulse duration of the injection pulse so as to counterbalance the required amount of air, and the injectors 80 inject the fuel only for the period corresponding to this pulse duration. Accordingly, the fuel supply amount can be controlled accurately. Since the fuel supply amount is small in the low induction zone, the required amount of hydrogen gas can be supplied even if the hydrogen gas is supplied through the injectors 80.

On the other hand, in the high induction zone, at least first fuel amount adjusting mechanism is actuated by opening the flow control valve 75. In this case, the fuel supply amount is controlled while adjusting the flow area by means of the flow control valve 75. The accuracy of the fuel supply control obtained by using the flow control valve 75 is lower than the one obtaining by using the injectors 80, but the fuel supply control can be executed sufficiently suitably in the high induction zone where the larger amount of fuel is supplied since an error becomes relatively small. Using the second fuel amount adjusting mechanism, a large amount of fuel can be supplied so as to counterbalance the large amount of air.

In the high induction zone, only the first fuel amount adjusting mechanism may be actuated, but the second fuel amount adjusting mechanism may be actuated in addition to parentheses at Step S24 of the above flow chart. With this in the first fuel amount adjusting mechanism as indicated arrangement, the accuracy of the fuel supply control in the high induction zone can be improved of the injectors 80 are used to adjust the fuel supply amount finely by causing the first fuel amount adjusting mechanism to supply the required amount of fuel while causing the second fuel amount adjusting mechanism to execute, for example, a feedback correction.

Further, the response of the fuel supply control can be attained if the fuel is injected asynchronously using the second fuel amount adjusting mechanism during the acceleration as indicated by broken line in FIG. 14.

The fuel supply apparatus as in the third embodiment is applicable not only to the rotary piston engine, but also to a reciprocating engine.

Further, fuel used in the gaseous fuel engine according to the invention is not limited to hydrogen gas, but city gas obtained by mixing hydrogen gas with methane gas, and the like can be also used effectively as such fuel.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A fuel supply apparatus for use with a gaseous fuel engine having a cylinder, comprising:
   an intake passage having an inlet port open to the cylinder and adapted for supplying air into the cylinder therethrough;
   fuel supply means for supplying gaseous fuel into the cylinder, the fuel supply means having a high pressure fuel supply system for use in a high induction zone where a larger amount of air is admitted into the cylinder, and a low pressure fuel supply system for use in a low induction zone where a smaller amount of air is admitted into the cylinder;
   the high pressure fuel supply system having a high pressure fuel supply port open to the cylinder independently of the inlet port, and adapted for supplying a larger amount of gaseous fuel into the cylinder at a pressure higher than a pressure in the cylinder during a former half of a compression stroke following an air intake stroke of the engine;
   the low pressure fuel supply system adapted for supplying a smaller amount of gaseous fuel into the cylinder at a finer adjusting scale than the high pressure fuel supply system;
   said low pressure fuel supply system having a first fuel amount adjusting means and said high pressure fuel supply system having a second fuel amount adjusting means, said first fuel amount adjusting means having an adjustment accuracy higher than said second fuel amount adjusting means; and control means for controlling actuation of the respective fuel supply systems according to an operating state of the engine.

2. A fuel supply apparatus as defined in claim 1 wherein the low pressure fuel supply system supplies the gaseous fuel to the cylinder at a pressure lower than the one at which the fuel is supplied by the high pressure fuel supply system during the air intake stroke, and the control means actuates at least the low pressure fuel supply system in the low induction zone of the engine while actuating only the high pressure fuel supply system in the high induction zone of the engine.

3. A fuel supply apparatus as defined in claim 2 wherein the low pressure fuel supply system includes a low pressure fuel supply port which is open directly to the cylinder and is opened and closed according to the actuation of the engine, and the low pressure fuel supply port is opened while the inlet port is opened.

4. A fuel supply apparatus as defined in claim 3 wherein the engine is a rotary piston engine including a cylinder defined by two side housings and a rotor housing sandwiched by the two side housings, and a rotor mounted on an eccentric shaft, and the inlet port and the high pressure fuel supply port are provided on one of the two side housings pressure fuel supply port is provided on the opposite side housing.

5. A fuel supply apparatus as defined in claim 2 wherein the control means actuates only the low pressure fuel supply system in the low induction zone of the engine, and actuates both the low pressure fuel supply system and the high pressure fuel supply system in an intermediate zone of the engine where a medium amount of air is admitted into the cylinder, and actuates the high pressure fuel supply system in the high induction zone of the engine.

6. A fuel supply apparatus as defined in claim 2 wherein the control means actuates only the low pressure fuel supply system when the engine is started and stopped.

7. A fuel supply apparatus for use with a gaseous fuel engine having a cylinder, comprising:

an intake passage having an inlet port open to the cylinder and adapted for supplying air into the cylinder therethrough;

fuel supply means for supplying gaseous fuel into the cylinder, the fuel supply means having a high pressure fuel supply system for use in a high induction zone where a larger amount of air is admitted into the cylinder, and a low pressure fuel supply system for use in a low induction zone where a smaller amount of air is admitted into the cylinder;

the high pressure fuel supply system having a high pressure fuel supply port open to the cylinder independently of the inlet port, and adapted for supplying a larger amount of gaseous fuel into the cylinder at a pressure higher than a pressure in the cylinder during a former half of a compression stroke following an air intake stroke of the engine;

the low pressure fuel supply system adapted for supplying a smaller amount of gaseous fuel into the cylinder at a finer adjusting scale than the high pressure fuel supply system; and control means for controlling actuation of the respective fuel supply systems according to an operating state of the engine;

wherein the low pressure fuel supply system supplies the gaseous fuel to the cylinder at a pressure lower than the one at which the fuel is supplied by the high pressure fuel supply system during the air intake stroke, and the control means actuates at least the low pressure fuel supply system in the low induction zone of the engine while actuating only the high pressure fuel supply system in the high induction zone of the engine.

8. A fuel supply apparatus as defined in claim 7 wherein the low pressure fuel supply system includes a low pressure fuel supply port which is open directly to the cylinder and is opened and closed according to the actuation of the engine, and the low pressure fuel supply port is opened while the inlet port is opened.

9. A fuel supply apparatus as defined in claim 8 wherein the engine is a rotary piston engine including a cylinder defined by two side housings and a rotor housing sandwiched by the two side housings, and a rotor mounted on an eccentric shaft, and the inlet port and the high pressure fuel supply port are provided on one of the two side housings, and the low pressure fuel supply port is provided on the opposite side housing.

10. A fuel supply apparatus as defined in claim 7 wherein the control means actuates only the pressure fuel supply system in the low induction zone of the engine, and actuates both the low pressure fuel supply system and the high pressure fuel supply system in an intermediate zone of the engine where a medium amount of air is admitted into the cylinder, and actuates the high pressure fuel supply system in the high induction zone of the engine.

11. A fuel supply apparatus as defined in claim 7 wherein the control means actuates only the low pressure fuel supply system when the engine is started and stopped.

12. A fuel supply apparatus for use with a gaseous fuel engine having a cylinder, comprising:

an intake passage having an inlet port open to the cylinder and adapted for supplying air into the cylinder therethrough;

fuel supply means for supplying gaseous fuel into the cylinder, the fuel supply means having a high pressure fuel supply system for use in a high induction zone where a larger amount of air is admitted into the cylinder, and a low pressure fuel supply system for use in a low induction zone where a smaller amount of air is admitted into the cylinder;

the high pressure fuel supply system having a high pressure fuel supply port open to the cylinder independently of the inlet port, and adapted for supplying a larger amount of gaseous fuel into the cylinder at a pressure higher than a pressure in the cylinder during a former half of a compression stroke following an air intake stroke of the engine;

the low pressure fuel supply system adapted for supplying a smaller amount of gaseous fuel into the cylinder at a finer adjusting scale than the high pressure fuel supply system; and control means for controlling actuation of the respective fuel supply systems according to an operating state of the engine;

wherein the high pressure fuel supply system includes first fuel amount adjusting means for adjusting the amount of gaseous fuel to be supplied by changing a flow area, the low pressure fuel supply system includes second fuel amount adjusting means which uses an electromagnetic fuel injection valve so as to adjust the amount of gaseous fuel to be supplied by changing an opening period of the fuel injection valve, and the control means actuates only the second fuel amount adjusting means in the low induction zone of the engine while actuating at least the first fuel amount adjusting means in the high induction zone of the engine.

13. A fuel supply apparatus as defined in claim 12 wherein the first and second fuel amount adjusting means are both actuated in the high induction zone of the engine.

14. A fuel supply apparatus as defined in claim 12 wherein the control means corrects the fuel supply amount by causing the second fuel amount adjusting means to inject the fuel asynchronously during acceleration.

15. A fuel supply apparatus as defined in claim 12 wherein the high pressure fuel supply system and the pressure fuel supply system respectively SUPPLY the fuel at specified timings in synchronism with the actuation of the engine.

16. A fuel supply apparatus as defined in claim 15 wherein the high pressure fuel supply system includes a mechanical timing valve which is moved in synchronism with an engine output shaft.

17. A fuel supply apparatus for use with a gaseous fuel engine having a cylinder, comprising:

an intake passage having an inlet port open to the cylinder and adapted for supplying air into the cylinder therethrough;

fuel supply means for supplying gaseous fuel into the cylinder, the fuel supply means having a high pressure fuel supply system and a lower pressure fuel supply system;

the high pressure fuel supply system having a high pressure fuel supply port open to the cylinder independently of the inlet port;

the low pressure fuel supply system adapted for supplying gaseous fuel into the cylinder through the intake passage;

said high pressure fuel supply system having a first fuel amount adjusting means and said low pressure fuel supply system having a second fuel amount adjusting means; and control means for controlling actuation of the respective fuel supply systems according to an operating state of the engine.

18. A fuel supply apparatus as defined in claim 17 wherein the control means actuates at least the low pressure fuel supply system in a low induction zone of the engine while actuating only the high pressure fuel supply system in a high induction zone.

19. A fuel supply apparatus as defined in claim 17 wherein the control means actuates at least the higher pressure fuel supply system in a high induction zone of the engine while actuating only the low pressure fuel supply system in a low induction zone.

* * * * *